United States Patent
Rademacher et al.

(10) Patent No.: US 9,447,765 B2
(45) Date of Patent: Sep. 20, 2016

(54) POWERTRAIN DELTA CURRENT ESTIMATION METHOD

(71) Applicant: Ford Global Technologies, LLC, Dearborn, MI (US)

(72) Inventors: Eric Michael Rademacher, Royal Oak, MI (US); Alexander O'Connor Gibson, Ann Arbor, MI (US); Robert Michael Grant, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 340 days.

(21) Appl. No.: 14/100,508

(22) Filed: Dec. 9, 2013

(65) Prior Publication Data
US 2014/0095056 A1 Apr. 3, 2014

Related U.S. Application Data (63) Continuation-in-part of application No. 13/179,747, filed on Jul. 11, 2011.

(51) Int. Cl.
*G06F 19/00* (2011.01)
*F02N 11/08* (2006.01)
*F02D 17/04* (2006.01)
*F02N 11/04* (2006.01)

(52) U.S. Cl.
CPC .......... *F02N 11/0825* (2013.01); *F02D 17/04* (2013.01); *F02N 11/084* (2013.01); *F02N 11/04* (2013.01); *F02N 2200/062* (2013.01); *F02N 2200/0809* (2013.01); *Y02T 10/48* (2013.01)

(58) Field of Classification Search
CPC .. F02N 11/084; F02N 11/0825; F02N 11/04; F02N 2200/062; F02N 2200/089; F02D 17/04; Y02T 10/48
USPC ........................................................ 701/112
See application file for complete search history.

(56) References Cited

U.S. PATENT DOCUMENTS

| | | | |
|---|---|---|---|
| 4,021,677 A | 5/1977 | Rosen et al. | |
| 4,218,717 A * | 8/1980 | Shuster | B60Q 9/001 307/10.7 |
| 4,284,053 A | 8/1981 | Merrick | |
| 4,408,582 A | 10/1983 | Merrick | |

(Continued)

FOREIGN PATENT DOCUMENTS

| | | |
|---|---|---|
| CN | 1295949 A | 5/2001 |
| DE | 3307220 | 9/1984 |

(Continued)

*Primary Examiner* — Hung Q. Nguyen
*Assistant Examiner* — Brian Kirby
(74) *Attorney, Agent, or Firm* — David B. Kelley; Brooks Kushman P.C.

(57) ABSTRACT

A vehicle includes an engine, electrical loads, and at least one controller. While the engine is on, the controller calculates the change in current demand of the electrical loads expected from turning the engine off. The decision to command the engine off is then based on the expected change in current demand. Electrical loads that will change state from on to off when the engine is turned off will increase the expected change in current demand. Electrical loads that will change state from off to on when the engine is turned off will decrease the expected change in current demand. Operating conditions associated with the electrical loads, such as operating voltage, temperature, and speed, may affect the expected change in current demand.

17 Claims, 3 Drawing Sheets

(56) References Cited

U.S. PATENT DOCUMENTS

| | | |
|---|---|---|
| 4,467,671 A | 8/1984 | Miyata et al. |
| 4,479,063 A * | 10/1984 | Ueda .................. F02D 17/04 290/30 R |
| 4,479,472 A | 10/1984 | Shimamura |
| 4,520,271 A * | 5/1985 | Goertler ................ B60S 1/08 123/179.3 |
| 4,625,281 A | 11/1986 | Deutsch |
| 4,788,487 A | 11/1988 | Picklesimer |
| 4,836,164 A | 6/1989 | Morozumi et al. |
| 4,898,005 A | 2/1990 | Sakurai |
| 5,072,597 A | 12/1991 | Bromley et al. |
| 5,163,399 A | 11/1992 | Bolander et al. |
| 5,216,895 A | 6/1993 | Kawai et al. |
| 5,336,932 A | 8/1994 | Barske |
| 5,365,445 A | 11/1994 | Takizawa |
| 5,463,993 A | 11/1995 | Livshits et al. |
| 5,559,704 A | 9/1996 | Vanek et al. |
| 5,806,485 A | 9/1998 | DeGeorge |
| 6,037,749 A | 3/2000 | Parsonage |
| 6,226,585 B1 | 5/2001 | Cullen |
| 6,316,842 B1 | 11/2001 | Kuroda et al. |
| 6,379,283 B1 | 4/2002 | Cullen |
| 6,429,539 B1 | 8/2002 | Suzuki et al. |
| 6,553,958 B1 | 4/2003 | Kolmanovsky et al. |
| 6,564,765 B2 * | 5/2003 | Kuroda ............... F02N 11/0825 123/179.4 |
| 6,564,774 B2 | 5/2003 | Ellims et al. |
| 6,570,266 B1 | 5/2003 | Wakashiro et al. |
| 6,608,394 B2 | 8/2003 | Osada et al. |
| 6,624,529 B2 | 9/2003 | Obayashi |
| 6,668,224 B2 | 12/2003 | Kawai et al. |
| 6,755,032 B1 | 6/2004 | Kotwicki et al. |
| 6,763,296 B2 | 7/2004 | Aldrich, III et al. |
| 6,805,090 B2 | 10/2004 | Bertness et al. |
| 6,845,305 B1 | 1/2005 | Raftari et al. |
| 6,913,558 B2 | 7/2005 | Mori et al. |
| 6,925,369 B2 | 8/2005 | Obayashi et al. |
| 7,017,360 B2 | 3/2006 | Kotwicki et al. |
| 7,032,393 B2 | 4/2006 | Tamai et al. |
| 7,173,347 B2 * | 2/2007 | Tani .................. B60R 16/0315 307/10.1 |
| 7,347,175 B2 * | 3/2008 | Lupo .................. F02D 41/042 123/179.4 |
| 7,503,413 B2 * | 3/2009 | Jiang ................... B60K 6/48 180/65.28 |
| 7,516,811 B2 | 4/2009 | Kolpasky et al. |
| 7,552,705 B2 | 6/2009 | Serkh et al. |
| 7,635,922 B2 | 12/2009 | Becker |
| 7,665,557 B2 | 2/2010 | Hughes et al. |
| 7,745,953 B2 | 6/2010 | Puccetti et al. |
| 7,869,911 B2 * | 1/2011 | Yamaguchi ............. B60K 1/00 180/65.23 |
| 8,205,594 B2 | 6/2012 | Fore et al. |
| 8,406,954 B2 | 3/2013 | Whitney et al. |
| 8,560,202 B2 | 10/2013 | Pebley et al. |
| 2002/0017261 A1 * | 2/2002 | Kuroda ............... F02N 11/0825 123/179.4 |
| 2002/0019687 A1 * | 2/2002 | Suzuki .................. B60K 6/48 701/22 |
| 2003/0018415 A1 | 1/2003 | Sonobe et al. |
| 2003/0171187 A1 * | 9/2003 | Aoki ..................... B60K 6/485 477/107 |
| 2003/0233835 A1 | 12/2003 | Tomita et al. |
| 2004/0011304 A1 * | 1/2004 | Herynek ................ F01P 7/164 123/41.1 |
| 2004/0084232 A1 | 5/2004 | Obayashi |
| 2004/0112074 A1 | 6/2004 | Komura et al. |
| 2004/0231315 A1 | 11/2004 | Gonzalez |
| 2005/0044873 A1 | 3/2005 | Tamai et al. |
| 2005/0193747 A1 | 9/2005 | Kajimoto et al. |
| 2005/0193757 A1 | 9/2005 | Lee et al. |
| 2006/0028778 A1 | 2/2006 | O'Gorman et al. |
| 2006/0116797 A1 | 6/2006 | Moran |
| 2006/0137643 A1 | 6/2006 | Thompson et al. |
| 2007/0007056 A1 | 1/2007 | Bowers et al. |
| 2007/0080006 A1 | 4/2007 | Yamaguchi |
| 2007/0170778 A1 | 7/2007 | Yamaguchi |
| 2007/0225882 A1 * | 9/2007 | Yamaguchi ........... B60W 50/14 701/36 |
| 2007/0255488 A1 | 11/2007 | Okubo et al. |
| 2008/0139360 A1 * | 6/2008 | Hayashi ................ B60K 6/445 477/3 |
| 2008/0306670 A1 | 12/2008 | Masterson et al. |
| 2009/0015203 A1 | 1/2009 | Oakes |
| 2009/0018707 A1 | 1/2009 | Oakes |
| 2009/0024264 A1 | 1/2009 | Aldrich, III et al. |
| 2009/0115419 A1 * | 5/2009 | Ueda .................. G01R 31/3624 324/430 |
| 2009/0241883 A1 * | 10/2009 | Nagoshi ............. F02N 11/0825 123/179.4 |
| 2010/0042277 A1 | 2/2010 | Naik et al. |
| 2010/0050671 A1 | 3/2010 | Kahn et al. |
| 2010/0125383 A1 | 5/2010 | Caouette |
| 2010/0145562 A1 | 6/2010 | Moran |
| 2010/0163220 A1 | 7/2010 | Nakajima |
| 2010/0217484 A1 | 8/2010 | Mizuno |
| 2010/0222973 A1 | 9/2010 | Senda et al. |
| 2010/0269776 A1 * | 10/2010 | Mizuno .................. F02D 29/06 123/179.4 |
| 2012/0083988 A1 | 4/2012 | Miyata et al. |
| 2012/0109469 A1 | 5/2012 | Pebley et al. |
| 2012/0253595 A1 | 10/2012 | Oakes |
| 2012/0271525 A1 | 10/2012 | Bucci et al. |
| 2012/0304670 A1 | 12/2012 | Kumar et al. |
| 2013/0018569 A1 * | 1/2013 | Sangameswaran . F02N 11/0825 701/112 |
| 2013/0060444 A1 | 3/2013 | Matsunaga et al. |
| 2013/0173142 A1 | 7/2013 | Kato |
| 2013/0226440 A1 | 8/2013 | Rademacher et al. |

FOREIGN PATENT DOCUMENTS

| | | |
|---|---|---|
| EP | 2138712 A1 | 12/2009 |
| JP | 58209613 | 12/1983 |
| JP | 10304503 A | 11/1998 |
| JP | H10325346 A | 12/1998 |
| JP | 2001173480 A | 6/2001 |
| JP | 2002155775 A * | 5/2002 |
| JP | 2006220113 A | 8/2006 |
| JP | 2009007998 A | 1/2009 |
| JP | 2009243292 A | 10/2009 |
| JP | 2010116877 A | 5/2010 |
| JP | 2010265785 A * | 11/2010 |
| WO | 2008089935 A1 | 7/2008 |

* cited by examiner

POWERTRAIN DELTA CURRENT ESTIMATION METHOD

CROSS-REFERENCE TO RELATED APPLICATIONS

This application is a continuation-in-part of application Ser. No. 13/179,747, filed Jul. 11, 2011, the disclosure of which is incorporated in its entirety by reference herein.

TECHNICAL FIELD

This disclosure relates to techniques for estimating electric current demands of powertrain related electrical loads.

BACKGROUND

A micro-hybrid vehicle may automatically stop its internal combustion engine for a period of time when particular conditions are met. Automatic engine stops may improve fuel economy by reducing the amount of time the engine is idling while the vehicle is at standstill or coasting to a stop.

SUMMARY

A vehicle includes an engine, an electrical bus, a first set of electrical components configured to demand current from the electrical bus while the engine is on and demand no current while the engine is off, a second set of electrical components configured to demand current from the electrical bus while the engine is off and demand no current while the engine is on, and at least one controller. The controller is programmed to selectively turn the engine off in response to an expected change in current demand on the bus that would (i) result from turning the engine off and (ii) cause total current demand to be less than a predetermined threshold. The expected change may be based on a difference between a sum of a present current demand from each component of the first set and a sum of an expected current demand from each component of the second set when the engine is off. The current demanded by some of the electrical components may be based on a voltage associated with the bus. The current demanded by some of the electrical components may be based on a respective operational speed associated with the electrical components. The current demanded by some of the electrical components may be based on a temperature associated with the electrical components. The temperature may be a coolant temperature.

A vehicle includes an engine, a plurality of electrical loads, and at least one controller. The controller is programmed to, while the engine is on, estimate an expected change in current demanded from the electrical loads that would result from turning the engine off based on an operating condition of the electrical loads and selectively turn the engine off based on the expected change. The operating condition may be a voltage associated with at least one of the electrical loads. The operating condition may be a speed associated with at least one of the electrical loads. The operating condition may be a temperature associated with at least one of the electrical loads. The operating condition may be an operating status of the electrical loads that changes between engine on and engine off. The electrical loads may include a fan, a fuel injector, an ignition coil, a purge valve, an air conditioning clutch, or an electric pump.

A method for controlling an engine includes, by at least one controller, predicting a change in current demand from engine on to engine off based on a difference between current demanded by components that will reduce current demand when the engine is turned off and current demanded by components that will increase current demand when the engine is turned off, and commanding the engine off based on the predicted change. The current demanded may be based on a voltage associated with at least one of the components. The current demanded may be based on a speed associated with at least one of the components. The current demanded may be based on a temperature associated with at least one of the components. The current demanded may be calculated using predetermined data tables indexed by an operating voltage, a speed, or a temperature.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
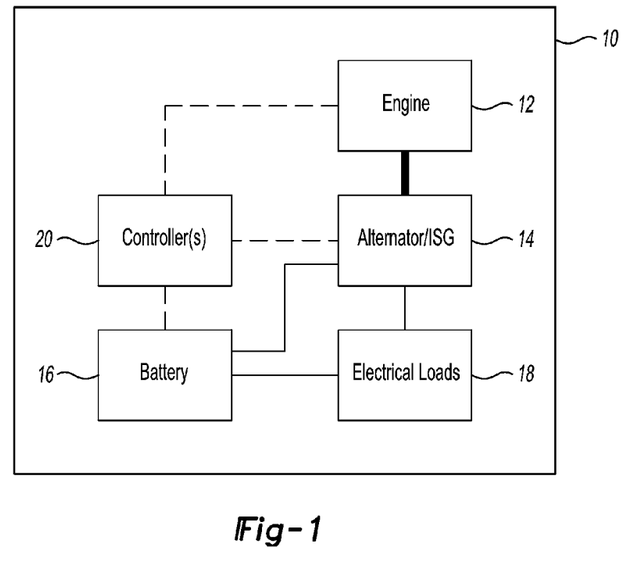
FIG. 1 is a block diagram of a micro-hybrid vehicle.

Referring to FIG. 1, a micro-hybrid vehicle 10 may include an engine 12, an alternator or integrated starter generator 14, a battery 16 (e.g., a 12 V battery), electrical loads 18 (e.g., pumps of a climate control system, a power steering assist system, etc.) in communication with/under the control of one or more controllers 20 (as indicated by dashed line). The engine 12 is mechanically connected with the alternator or integrated starter generator 14 (as indicated by heavy line) such that the engine 12 may drive the alternator or integrated starter generator 14 to generate electric current. The alternator or integrated starter generator 14 and battery 16 are electrically connected with each other and the electrical loads 18 (as indicated by thin line). Hence, the alternator or integrated starter generator 14 may charge the battery 16; the electrical loads 18 may consume electric current provided by the alternator or integrated starter generator 14 and/or battery 16.

The controllers 20 may initiate an auto stop or auto start of the engine 12. As the vehicle 10 comes to a stop, for example, the controllers 20 may issue a command to begin the process to stop the engine 12, thus preventing the alternator or integrated starter generator 14 from providing electric current to the electrical loads 18. The battery 16 may provide electric current to the electrical loads 18 while the engine 12 is stopped. As a brake pedal (not shown) is disengaged (and/or an accelerator pedal (not shown) is engaged) after an engine auto stop, the controllers 20 may issue a command to begin the process to start the engine 12, thus enabling the alternator or integrated starter generator 14 to provide electric current to the electrical loads 18.

Figure 2:
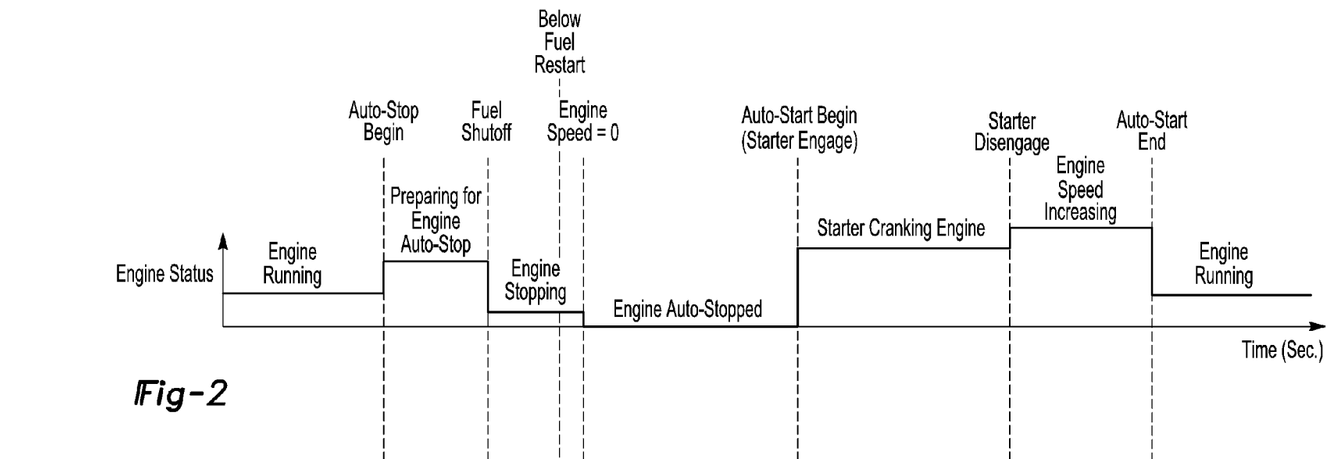
FIG. 2 is a plot of engine status versus time before, during and after an engine stop/start event.

Referring to FIG. 2, an engine auto stop event may include several stages: "auto-stop begin," which marks the beginning of the engine auto stop event; "preparing for engine auto-stop," which is the time period during which vehicle systems as well as the engine are prepared for the impending engine stop (if an auto stop inhibit condition is detected during this stage, the preparation for the impending engine stop is discontinued and the vehicle systems and engine are returned to their normal operating modes); "fuel shutoff," which marks the point at which fuel flow to the engine is stopped; "engine stopping," which is the time period during which the engine speed reduces to 0; "below fuel restart," which marks the point after which if a restart is requested during the "engine stopping" stage, the starter may need to be engaged to crank the engine (if a restart is requested before "below fuel restart" and during the "engine stopping" stage, the engine may be restarted by turning the flow of fuel back on); "engine speed=0," which marks the point at which the engine speed is near or equal to 0; "engine auto-stopped," which is the time period during which the engine is off; "starter engage," which marks the point at which the starter starts to crank the engine in an effort to start the engine (in response to detecting an engine auto start condition); "starter cranking engine," which is the time period during which the engine is unable to crank under its own power; "starter disengage," which marks the point at which the engine is able to crank under its own power; "engine speed increasing," which is the time period during which the speed of the engine increases to its running speed (a speed at or above target idle speed); and, "auto-start end," which marks the point at which the speed of the engine achieves its running speed.

Referring again to FIG. 1, the electrical loads 18 may be operative while the engine 12 is off during an engine stop/start event. For example, pumps associated with a climate control system may be on during this time period. Hence, the battery 16 may need to provide current to support these loads. The current demands of the electrical loads 18 during an engine stop/start event, however, may exceed the recommended capabilities of the battery 16. That is, voltage of the battery 16 may fall below a recommended limit while supporting the electrical loads 18 during an engine stop/start event. To prevent this situation from occurring, the controllers 20 may determine the current demands of the electrical loads 18 and compare them with a predetermined threshold. For example, values of current provided by the alternator or integrated starter generator 14 and battery 16 may be summed to determine the total current demand of the electrical loads 18. If the total current demand exceeds the predetermined threshold, the controllers 20 may inhibit any attempt to auto stop the engine 12. The predetermined threshold may be determined by testing, simulation, etc. and selected so as to preclude the voltage of the battery 16 from falling below a desired level.

The current demands of certain of the electrical loads 18 may depend on whether the engine 12 is on or off. For example, the current demands of an engine cooling fan or fuel pump may decrease to 0 while the engine 12 is off during an engine stop/start event. Likewise, the current demands of pumps associated with a climate control system may decrease while the engine 12 is off during an engine stop/start event. Current demands of other subsystems, however, may increase while the engine 12 is off during an engine stop/start event. Hence, the net value of the current demands of the electrical loads 18 may either decrease or increase once the engine 12 has been auto stopped.

Inhibiting engine auto stops based on actual values of current provided by the alternator or integrated starter generator 14 and battery 16 prior to an engine stop/start event may result in fewer engine auto stops and less than optimal fuel economy because current demands of the electrical loads 18 may decrease once the engine 12 has been auto stopped. Hence, estimates of change in current usage of the electrical loads 18 during an engine stop/start event may be used in making the decision as to whether to inhibit an engine auto stop. That is, change in current demands of the electrical loads 18 that result from stopping the engine 12 may be quantified by testing, simulation, etc. and made available to the controllers 20 so that the decision as to whether to inhibit an auto stop of the engine 12 may be based on an estimate of the current demands of the electrical loads 18 while the engine 12 is off.

Figure 3:
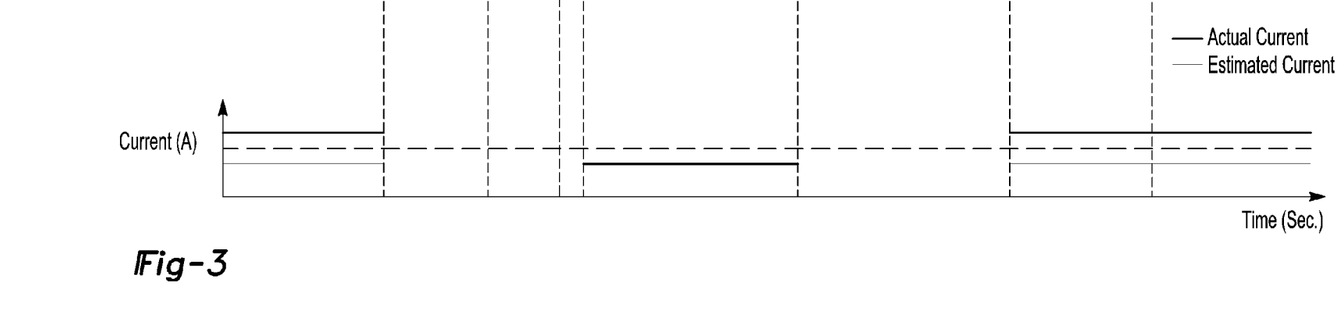
FIG. 3 is a plot of actual and estimated system currents associated with the plot of FIG. 2.

Referring to FIG. 3, the actual system current and estimated system current may be determined continually/periodically prior to an engine auto stop. For example, the actual or net system current (as indicated by thick line) may be determined by summing values of current provided by the alternator or integrated starter generator 14 and battery 16. The estimated system current (as indicated by thin line) may be calculated by subtracting (or adding) the expected reduction (or increase) in current demands that accompany an engine auto stop from the actual system current. The expected reduction (or increase) in current demands that accompany an engine auto stop information may be stored in memory and accessed as needed, or detected by current sensors for example. The estimated system current may then be compared with a threshold current (as indicated by dashed line). If the estimated system current is greater than the threshold current, any attempt to initiate an engine auto stop may be inhibited (the engine will be prevented from auto stopping). If the estimated system current is less than the threshold current, any attempt to initiate an engine auto stop may not be inhibited (the engine may be allowed to auto stop). For example, an inhibit engine auto stop flag may be set according to the aforementioned comparison. Such a flag may be set to zero when the estimated system current is less than the current threshold, and may be set to one when the estimated system current is greater than the current threshold. This flag may then be checked as part of the standard routine for determining whether to initiate an engine auto stop.

In other examples, the estimated system current may need to be less than the threshold current for some predetermined time period (e.g., 3 seconds) before any attempt to initiate an engine auto stop is allowed. Likewise, the estimated system current may need to be greater than the threshold current for some predetermined time period before any attempt to initiate an engine auto stop is inhibited. Such strategies may be used to minimize the impact transient changes in current have on the decision as to whether to inhibit engine auto stops. Other scenarios are also contemplated.

Assuming the estimated system current is less than the threshold current, determination of the estimated system current may be suspended once an engine auto stop has been initiated. The system current may experience transient events as various vehicle subsystems prepare for engine shutdown. These transient events may interfere with the accuracy of any estimated system current determination. The value of the estimated system current determined just prior to the initiation of an engine shut down may thus be held until engine speed equals zero.

Once engine speed equals zero, the actual system current may be again continually/periodically determined. Electrical loads operative during the engine auto stop, in the example of FIG. 3, are controlled such that their current demands match those estimated prior to the initiation of the engine auto stop. That is, an engine cooling fan estimated to experience a 0.3 A reduction in operating current during an engine auto stop will be controlled so that it does experience a 0.3 A reduction in operating current during the engine auto stop, etc. This control scheme may continue until an engine auto start condition is detected (e.g., a driver steps on an accelerator pedal, the actual system current increases above the threshold current for some predetermined period of time, etc.) Actual system current may then increase as a starter is used to crank the engine. In certain examples such as the example of FIG. 3, determination of the actual system current is suspended while the starter is cranking the engine because of the amount of current required by the starter. Once the engine is operating under its own power, determinations of the actual and estimated currents may resume as described above.

Figure 4:
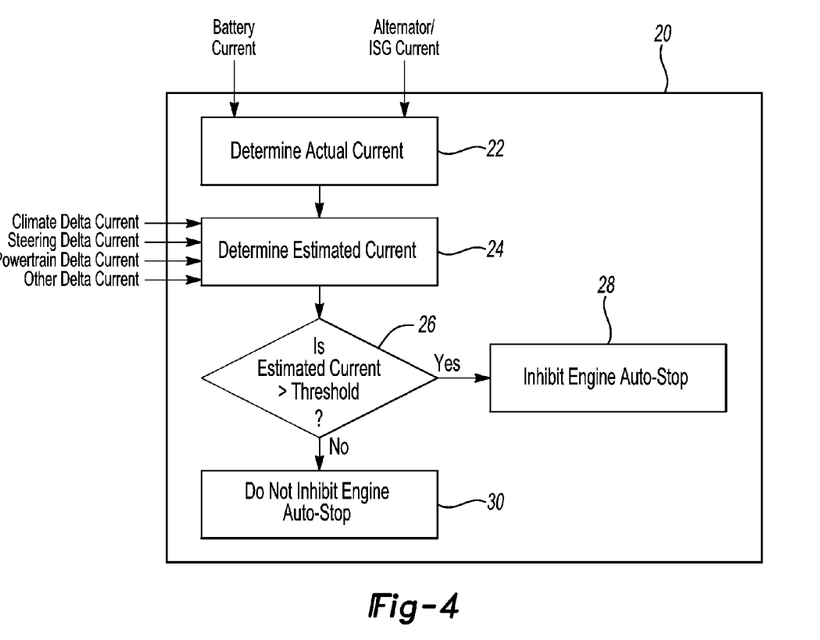
FIG. 4 is a flow chart of an algorithm for determining whether to inhibit an auto stop of an engine.

Referring to FIG. 4, an actual current may be determined at operation 22. For example, the controllers 20 may read information about battery current and alternator or integrated starter generator current available from a controller area network. Values associated with this information may be summed to calculate an actual current. At operation 24, an estimated current may be determined. The controllers 20, for example, may read information about reductions (or increases) in current expected to be experienced by any climate, steering and/or powertrain system, etc. during an engine shutdown and subtract this from (or add this to) the actual current to calculate an estimated current. At operation 26, it is determined whether the estimated current is greater than the threshold current. The controllers 20, for example, may compare the estimated current with the threshold current. If yes (an auto stop inhibit condition), an engine auto stop may be inhibited at operation 28. For example, the controllers 20 may prevent attempts to auto stop the engine 12. If no (an auto stop allow condition), an engine auto stop may be allowed at operation 30. For example, the controllers 20 may permit attempts to auto stop the engine 12.

Figure 5:
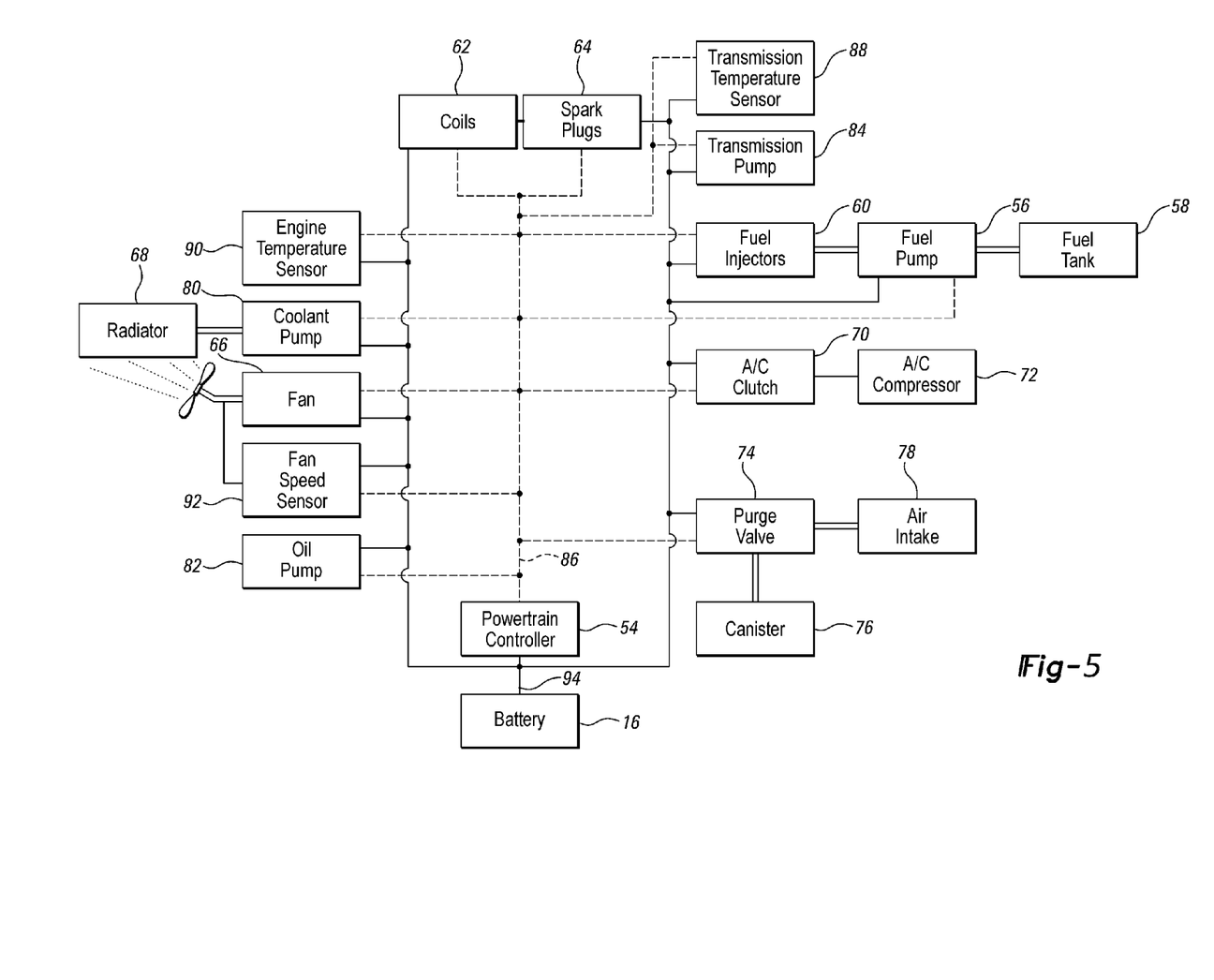
FIG. 5 is a block diagram demonstrating some example loads associated with a powertrain.

The controller 20 may determine if conditions are appropriate for stopping the engine. One technique of preventing excessive engine start/stop cycling may be to predict the amount of current required when the engine is off. This prediction may be made before the engine is actually stopped. If the predicted current required when the engine is off is too high, the engine stop may be inhibited. If the predicted current is below a threshold, the engine may be stopped. The controllers 20 may require that each component or subsystem report an expected change in current required when the engine 12 is stopped. In this manner, a coordinating controller could sum all of the predicted current draws to determine a total current draw. The controller may then use this predicted current to decide if the engine should be stopped FIG. 5 shows an example diagram of a powertrain system comprised of typical powertrain-related electrical loads. Note that other combinations of electrical loads are possible and the following description is not limited to those shown. A powertrain or other subsystem may be comprised of many components that require electric current. One or more powertrain controllers 54 may be required to manage and control the powertrain electrical loads. The powertrain electrical loads may include any devices requiring electrical current that are controlled by the powertrain controllers 54. The powertrain electrical loads may be those devices that are used for operating the engine and transmission. The powertrain electrical loads may also include those devices that are connected to the powertrain or devices that are operated in response to the operation of the powertrain.

Some powertrain electrical loads may always be activated when the engine is running A fuel pump 56 may be activated to provide fuel to the injectors 60 from the fuel tank 58. The fuel pump 56 may be activated electrically by a signal from the controller 54. Fuel injectors 60 may be activated to distribute the fuel into the cylinders for combustion. Coils 62 may be activated provide energy to the spark plugs 64 for igniting the air/fuel mixture in the cylinders.

Some powertrain electrical loads may or may not be activated when the engine is running A cooling fan 66 may be activated to provide airflow to reduce the temperature of coolant flowing through a radiator 68. In addition to being activated, an electrical load may be operated at different operating levels. For example, the cooling fan may be operated at different speeds depending on the conditions present during operation. A fan operating at different speeds may require a different level of current for each speed. A fan speed sensor 92 may be present to allow the controller 54 to measure the speed of the fan 66. An air conditioning clutch 70 may be activated to engage a compressor 72 for climate control. A purge valve 74 may be activated to divert fuel vapors from a canister 76 to an air intake 78.

Some powertrain electrical loads may be activated when the engine is stopped. A traditional powertrain may have a coolant pump that is mechanically driven by rotation of the engine or transmission. When the engine is not rotating, a mechanically driven coolant pump will no longer provide coolant flow. An electric coolant pump 80 may be activated to circulate coolant through the powertrain when the engine is stopped. An electric oil pump 82 may be present to circulate oil 82 through the engine. A transmission fluid pump 84 may also be present to circulate fluid through the transmission as required. Fluid pressure may be required to be maintained in the engine stopped condition to ensure that the transmission will be operational when the engine is restarted.

Each electrical load described may be activated or deactivated by the controller 54. Each device may be connected to the controller 54 by means of a control signal 86. The control signal 86 is represented as a dashed line in FIG. 5 and represents all the control signals 86 required in the powertrain system. That is, the control signal 86 represents multiple control signals. The control signal 86 may be implemented as discrete or serial outputs. The control signal 86 line also represents feedback signals that are returned to the controller 54 for control and monitoring purposes.

In addition, each electrical load may be connected to the battery 16. The battery 16 may supply energy for operation of the electrical loads. An electrical power bus 94 connecting the battery 16 to the electrical loads is depicted in FIG. 5. The electrical power bus 94 may connect to each of the electrical loads. In other embodiments, some electrical loads may receive power through a controller 54 allowing the load to turn on and off based on operating conditions determined by the controller 54.

During operation of the powertrain, the voltage of the battery 16 may fluctuate depending on the operation of the electrical loads. The voltage of the battery 16 may be measured and monitored by the controller 54. During operation of the electrical loads, the loads may be activated to demand current from the battery 16.

The components may have particular operating characteristics. There may be several modes of operation. Some components may always be on when the engine is running and turned off when the engine is stopped. Examples of these types of components may be fuel pumps, injectors, and coils. Some components may sometimes be on when the engine is running and turned off when the engine is stopped. Examples of these types of components may be cooling fans, A/C clutches, and purge valves. Some components may be off when the engine is running and be turned on when the engine is stopped. Examples of these types of components may be pumps and valves that are required for the auto-stop event.

A powertrain system may be required to communicate a present current demand and a predicted current demand from the battery 16 to another module or function. Alternatively, the powertrain system may be required to report a predicted change or delta in the current demand under certain conditions. The powertrain system may report the change in current demand between an engine running condition and an engine off condition. This communication may be over a network, such as a CAN bus, or may be through internal memory within a controller.

To determine a change in the powertrain current demand when the engine 12 is turned off, the current demand while the engine 12 is running may need to be known. This may be accomplished by calculating the current demand of powertrain components when the engine 12 is running Alternatively, the current demand of the components may be measured using current sensors. The implementation of this may take many forms. For components that are controlled as on/off devices, the system may store a rated current demand for each of the components during activation. For all components that are required to be on when the engine 12 is running, a table may be implemented that estimates the total current demanded for all the components. In addition, since the voltage of the battery 16 may fluctuate, the total current demand may be a function of the battery or 16 voltage.

An important factor in the current demand estimate may be the battery 16 voltage. The battery 16 voltage is important because the current demand may change as the battery 16 voltage fluctuates. Changes in the battery 16 voltage may affect the maximum current demand and power demand. A typical on/off type load may operate by applying the battery 16 voltage across a load. The current demand is a function of the load impedance and the applied voltage. As the voltage magnitude changes, the magnitude of the current demand will change in response.

Other loads may have a more complex relationship between voltage and current. For example, a motor driving a fan may have a current demand that depends on the battery voltage and the output speed of the motor. A similar relationship may exist for pumps and other motor driven loads.

Some components, such as motors or fans, may be controlled to a current value between zero and a rated value, independent of the system voltage. At the limits, the maximum current may depend on the system voltage. These components may require knowledge of the presently requested current demand and the maximum possible current demand based on the voltage. These components may or may not be operating at the present time. For example, a fan may be operated at different speeds while the vehicle is operating depending on the operating conditions. The speed of the fan may be adjusted by controlling the current applied to the fan. A fan or motor may have a rated speed at a given current value. To estimate the change in current demand, it may be necessary to know the system voltage and the speed of motor/fan. The speed may be the actual speed or a commanded speed. The speed may be measured via a speed sensor or may be estimated.

Some components may operate as needed when the engine is running A purge valve 74 is one type of component that may be occasionally on when the engine is running The change in current demand may be calculated based on the on/off condition of the purge valve 74. The current demand may be estimated by knowing the load impedance of the purge valve 74. If the purge valve 74 is presently activated, then current demand may be reduced when the engine is stopped. If the purge valve 74 is presently deactivated, then there may be no reduction in current demand when the engine is stopped.

Another component that may operate as needed when the engine is running is an air conditioning clutch (AC clutch) 70. The reduction in current demand due to this component is a function of whether the AC clutch 70 is presently engaged and demanding current. The load impedance of the clutch 70 may be known and current demand can be estimated based on the voltage and on/off state of the clutch 70. When the AC clutch 70 is demanding current, the actual reduction in current demand may be a function of the battery 16 voltage.

Some components may be required operate when the engine is off. An example of such a component may be an electric pump (80, 82, 84). These pumps may not be required to be active when the engine is running, but may be required when the engine is stopped. These loads may demand more current in the engine off condition, that is, they may reduce the predicted change in current demand.

The powertrain subsystem may need to provide an estimate of the change in current demand expected when transitioning to an engine stopped condition. This estimate may be provided whenever the engine is running Preferably, once the engine is stopped, the actual current demand would closely match the predicted current demand. In some embodiments, the controller may control the current demand after engine stop to match the previously predicted demand value.

A table may be constructed for each component in the powertrain that demands electric current. The values in the table may be a function of the operating conditions of the components. Factors that may be taken into account may include the system voltage, output speed of the component, on/off status of the component, temperature of the component, temperature of associated fluid or coolant and ambient temperature. The table may provide an estimate of the current demand for that component at the given operating conditions. Components having similar characteristics may be lumped into a common table that is the summation of the individual current demand values under the same operating conditions.

To ascertain the delta current demand between the engine on and off states, the controller may index into the table based on the current operating conditions of the component. The table may provide an expected change in current demand based on the future expected operating condition during an engine stopped condition. For example, a component that is demanding current while the engine is running but will be deactivated at engine stop will have a table value that is an estimate of the present current demand of the component. In this case, the present current demand will be a reduction in current demand. A component that is presently not demanding electrical current and that will not be activated at engine stop may have a table value of zero as there will be no delta current demand contribution from this component. A component that is presently not demanding electrical current and that will be activated at engine stop may have an estimate of the expected current demand of the component. In this case, the expected current demand will be an increase in the current demand.

To reduce execution time, components with similar characteristics may be grouped together by summing the estimated current demands together in a table. For example, all components that are on when the engine is running and deactivated when the engine is off may be combined into a single table.

An important feature may be that measured values of current are not required. The current demands of each component may be derived from test data. Requiring measured current values may increase cost and processing time as current sensing hardware would be required for each component. By characterizing the components, a reasonable estimate of the delta current demand may be obtained. However, if available, current measurements may be used and may help to improve accuracy.

Alternatively, a model of a component or an equation may be used to estimate the current demand values. Tables may require less execution time, an important consideration for automotive systems.

The predicted change in powertrain current demand between engine running and engine stopped may be used in the decision to allow or inhibit an auto-stop of the engine.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:
   an engine;
   an electrical bus;
   a first set of electrical components configured to demand current from the electrical bus while the engine is on and demand no current while the engine is off;
   a second set of electrical components configured to demand current from the electrical bus while the engine is off and demand no current while the engine is on; and
   at least one controller programmed to selectively turn the engine off in response to an expected change in current demand on the bus that would (i) result from turning the engine off and (ii) cause total current demand to be less than a predetermined threshold and, in response to the engine being off, control current demands for the first set and the second set to match the expected change that resulted in turning the engine off.

2. The vehicle of claim 1 wherein the expected change is based on a difference between a sum of a present current demand from each component of the first set and a sum of an expected current demand from each component of the second set when the engine is off.

3. The vehicle of claim 1 wherein the current demanded by some of the electrical components is based on a voltage associated with the bus.

4. The vehicle of claim 1 wherein the current demanded by some of the electrical components is based on respective operational speed associated with the electrical components.

5. The vehicle of claim 1 wherein the current demanded by some of the electrical components is based on a temperature associated with the electrical components.

6. The vehicle of claim 5 wherein the temperature is a coolant temperature.

7. A vehicle comprising:
   an engine;
   a plurality of electrical loads; and
   at least one controller programmed to, while the engine is on, estimate an expected change in current demanded from the electrical loads that would result from turning the engine off based on an operating condition of the electrical loads and selectively turn the engine off based on the expected change and, in response to the engine being off, control current demands for the electrical loads to match the expected change that resulted in turning the engine off.

8. The vehicle of claim 7 wherein the operating condition is a voltage associated with at least one of the electrical loads.

9. The vehicle of claim 7 wherein the operating condition is a speed associated with at least one of the electrical loads.

10. The vehicle of claim 7 wherein the operating condition is a temperature associated with at least one of the electrical loads.

11. The vehicle of claim 7 wherein the operating condition is an operating status of the electrical loads that changes between engine on and engine off.

12. The vehicle of claim 7 wherein the electrical loads include a fan, a fuel injector, an ignition coil, a purge valve, an air conditioning clutch, or an electric pump.

13. A method for controlling an engine comprising:
by at least one controller,
- predicting a change in current demand from engine on to engine off based on a difference between current demanded by components that will reduce current demand when the engine is turned off and current demanded by components that will increase current demand when the engine is turned off;
- selectively commanding the engine off based on the predicted change; and
- controlling, in response to the engine being off, current demands for the components to match the predicted change that caused the engine turn off.

14. The method of claim 13 wherein the current demanded is based on a voltage associated with at least one of the components.

15. The method of claim 13 wherein the current demanded is based on a speed associated with at least one of the components.

16. The method of claim 13 wherein the current demanded is based on a temperature associated with at least one of the components.

17. The method of claim 13 wherein the current demanded is calculated using predetermined data tables indexed by an operating voltage, a speed, or a temperature.

* * * * *